Dec. 28, 1926.

C. W. METZGAR 1,612,638

DUAL PRESSURE CLEARANCE UNLOADER

Filed July 15, 1926

INVENTOR
Chester W. Metzgar
BY Herbert G. Ogden
HIS ATTORNEY.

Patented Dec. 28, 1926.

1,612,638

UNITED STATES PATENT OFFICE.

CHESTER W. METZGAR, OF EASTON, PENNSYLVANIA, ASSIGNOR TO INGERSOLL-RAND COMPANY, OF JERSEY CITY, NEW JERSEY, A CORPORATION OF NEW JERSEY.

DUAL-PRESSURE CLEARANCE UNLOADER.

Application filed July 15, 1926. Serial No. 122,674.

This invention relates to compressor unloaders, but more particularly to an automatic dual pressure clearance unloader responsive to discharge pressure, and the objects of the invention are to enable the unloader to be controlled or set for operation at different discharge pressures according to the requirements of the system.

Occasions frequently arise in which operation of the compressor at higher or lower pressure than normal is desirable, as for example in case the compressor is supplying pressure fluid for blowing coal dust, and the line becomes clogged. In accordance with this invention, the pressure at which the compressor operates may be automatically increased by means of a regulator controlling the unloader. Adjustment of the regulator again reduces the operating pressure, and other instances will arise in which this automatic adjustment is necessary and desirable.

A preferred form of the invention is shown in the accompanying drawings, in which—

Figure 1:
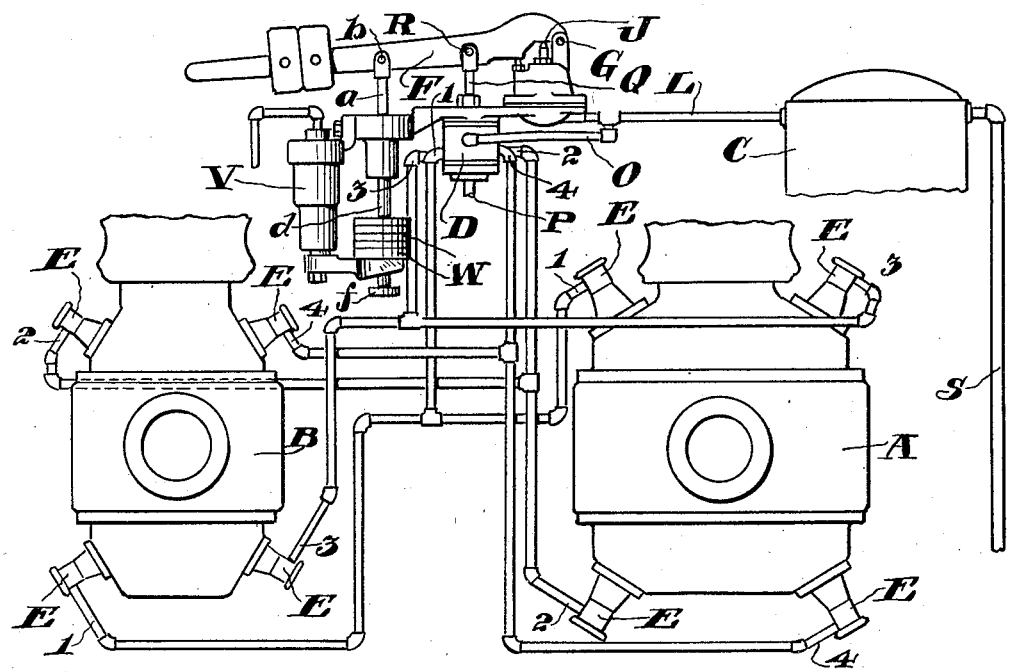
Figure 2:
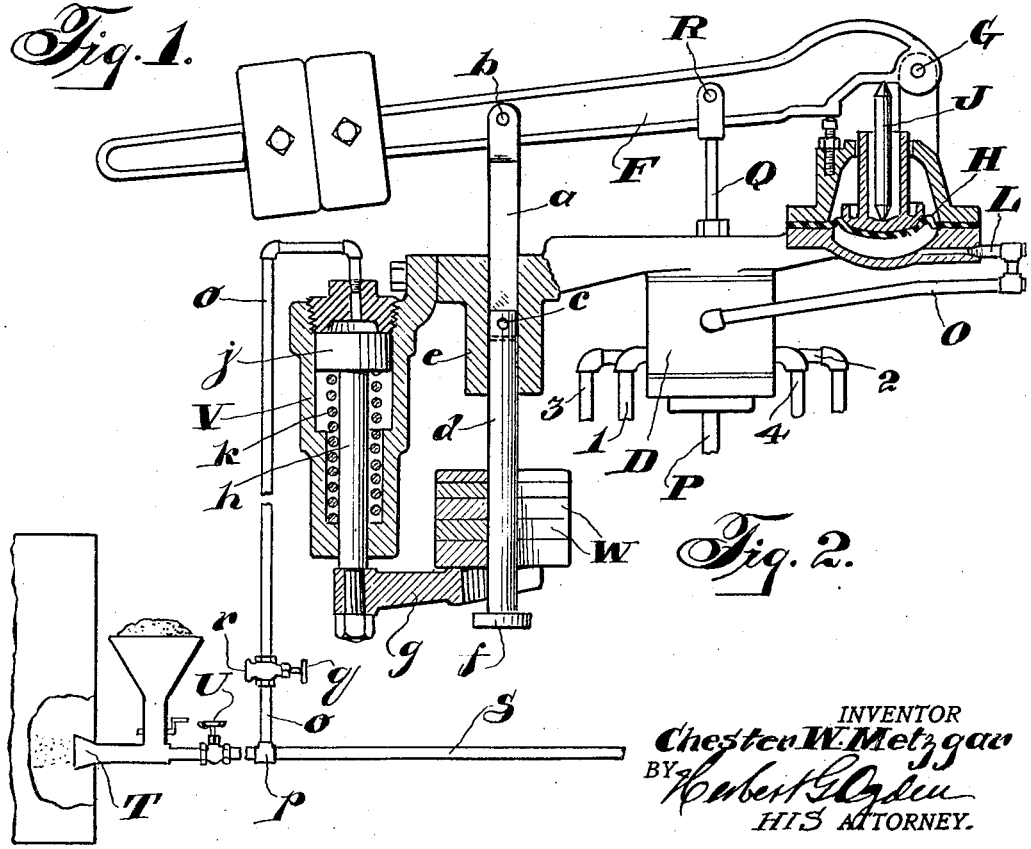

Figure 1 is a diagrammatic end view of a multiple cylinder compressor having the invention applied thereto, only so much of the compressor and unloader being shown as will serve to illustrate the invention, and Figure 2 is an enlarged detail longitudinal elevation partly in section taken through the unloader and regulator.

Referring to the drawings, a compound duplex compressor is illustrated, having the low pressure cylinder A and the high pressure cylinder B. The intercooler is omitted for clearness of illustration, but it is to be understood that the compressor discharges into the tank or receiver C in the usual manner and the compressor may be driven from any suitable source of power, as for instance, an electric motor (not shown).

The regulator D may be constructed like the regulator shown in United States Patent No. 1,430,578 granted to me October 3, 1922 for a compressor regulator to which patent reference may be made for the details of the regulator and only the principal parts required for an understanding of this invention will be here described.

The regulator is of the clearance control type and controls clearance valves (not shown) in the valve casings E on the compressor cylinders all as shown in said patent. The pipes 1, 2, 3 and 4 lead from the regulator D to the valve casings E on the compressor cylinders as usual and a lever arm F pivoted at G to a portion of the regulator casing is responsive to discharge or receiver pressure by means of the diaphragm H and pin J. Receiver pressure is led to the diaphragm casing through the pipe L and receiver pressure is also supplied to the regulator for operating purposes through the pipe O. The vent pipe P from the regulator is open to atmosphere. The pilot valve Q operating in the regulator D and controlling the pipe connections 1, 2, 3 and 4 is pivotally hung from the lever F at the point R and in the operation of the regulator as described in the aforesaid patent, the upward and downward movement of the lever F causes the operation of the clearance valves in the casings E successively in pairs to unload and load the compressor.

In Figure 2 the service pipe S from the receiver C is shown connected to a nozzle T for blowing coal dust into a furnace, this pipe being controlled by the hand-operated valve U. In case it is desired to have the compressor operate at a higher pressure for blowing the coal dust, the unloader should be so adjusted that it will not start to unload the compressor until a higher operating pressure has been reached. The compressor will thus operate at an increased pressure as long as desired. For this purpose the unloader is provided with a regulator V preferably operated by pressure fluid and arranged to apply weights W to the lever arm F for increasing the operating pressure or to remove the weights from the arm for decreasing the operating pressure.

As shown a link $a$ pivoted at $b$ to the lever F is pinned at $c$ to the rod $d$ guided in the frame $e$. The weights W are placed over the rod $d$ and may be suspended on the rod as by means of the enlarged head $f$, when the regulator arm $g$ is lowered sufficiently, or removed from said head $f$ as the regulator arm is raised.

This regulator arm $g$ as shown is connected to the plunger rod $h$ of the piston $j$ operating in the regulator V. A compression spring $k$ in the regulator underneath the piston $j$ normally maintains the piston in retracted position so that the weights W are free from the rod $d$. A pressure fluid connection $o$ connected at any suitable point $p$ to the service pipe S or other portion of the discharge connection controlled by the valve $q$ permits pressure fluid to be applied above the piston $j$ of the regulator to force the piston downwardly against the spring $k$ and lower the weights W into a position to be picked up by the rod $d$, thus placing more weight on the lever F and causing the compressor to operate at a higher pressure. The valve $q$ in the fluid connection $o$ is a two-way valve having the vent $r$ and when the valve $q$ is turned to vent the pipe $o$ to atmosphere the spring $k$ will retract the piston $j$ and raise the weights W which permits the compressor to operate at lower pressure.

I claim:

1. In a compressor, the combination of a cylinder and piston, automatic unloading means for the cylinder, and means for causing the unloader to start the unloading operation at different predetermined pressures.

2. In a compressor, the combination of a cylinder and piston, an automatic clearance unloader responsive to discharge pressure, and fluid actuated means controlling said unloader to cause the unloader to start the unloading operation at different discharge pressures.

3. In a compressor, the combination of a cylinder and piston, an automatic clearance unloader having a movable arm responsive to discharge pressure, and fluid actuated means for increasing or decreasing the resistance to movement of said arm, whereby the unloader is caused to operate at different pressures.

4. In a compressor, the combination of a cylinder and piston, an automatic clearance unloader having a movable arm responsive to discharge pressure, weights adapted to be suspended from said arm, and fluid actuated means for increasing or decreasing the weight carried by said arm, whereby the unloader is caused to operate at different pressures.

In testimony whereof I have signed this specification.

CHESTER W. METZGAR.